(12) United States Patent
Stein

(10) Patent No.: US 10,138,937 B2
(45) Date of Patent: Nov. 27, 2018

(54) INTERMEDIATE BEARING FOR A DRIVE SHAFT TRAIN

(71) Applicant: SPICER GELENKWELLENBAU GMBH, Essen (DE)

(72) Inventor: Thomas Stein, Essen (DE)

(73) Assignee: Spicer Gelenkwellenbau GmbH, Essen (DE)

(*) Notice: Subject to any disclaimer, the term of this patent is extended or adjusted under 35 U.S.C. 154(b) by 0 days.

(21) Appl. No.: 15/569,883

(22) PCT Filed: Jan. 26, 2016

(86) PCT No.: PCT/EP2016/051585
§ 371 (c)(1),
(2) Date: Oct. 27, 2017

(87) PCT Pub. No.: WO2016/173729
PCT Pub. Date: Nov. 3, 2016

(65) Prior Publication Data
US 2018/0112706 A1   Apr. 26, 2018

(30) Foreign Application Priority Data
Apr. 29, 2015 (DE) .................. 10 2015 106 696

(51) Int. Cl.
*F16C 27/06* (2006.01)
*F16C 19/06* (2006.01)
(Continued)

(52) U.S. Cl.
CPC ............ *F16C 27/066* (2013.01); *F16C 19/06* (2013.01); *F16C 33/7886* (2013.01);
(Continued)

(58) Field of Classification Search
CPC ..... F16C 19/06; F16C 27/066; F16C 33/7886; F16C 33/80; F16C 35/047; F16C 2326/05; F16C 2326/06; F16C 2326/26
(Continued)

(56) References Cited

U.S. PATENT DOCUMENTS 2,081,237 A   5/1937   Jantsch
2,155,919 A * 4/1939   Wooler ................. F16C 27/066
                                                         105/453
(Continued)

FOREIGN PATENT DOCUMENTS

CN   201457394 U   5/2010
DE   3320760 A1   12/1984
(Continued)

OTHER PUBLICATIONS

Machine-generated English Translation of DE102006042064, obtained via Espacenet Patent Search.
(Continued)

*Primary Examiner* — Marcus Charles
(74) *Attorney, Agent, or Firm* — Marshall & Melhorn, LLC

(57) ABSTRACT

An intermediate bearing for a drive shaft train of a motor vehicle has an elastic bearing body which has a bore and a supporting ring which is arranged in the bore and has a receiving space for receiving an anti-friction bearing. The receiving space defines a longitudinal axis, and two sealing washers which are spaced apart axially from one another and have in each case one central opening for receiving a drive component. The supporting ring is arranged between the two sealing washers. The sealing washers have in each case one groove which extends concentrically with respect to the longitudinal axis. The supporting ring engages into the two grooves of the sealing washers.

13 Claims, 3 Drawing Sheets

(51) Int. Cl.
*F16C 33/78* (2006.01)
*F16C 33/80* (2006.01)
*F16C 35/04* (2006.01)

(52) U.S. Cl.
CPC .............. *F16C 33/80* (2013.01); *F16C 33/805* (2013.01); *F16C 35/047* (2013.01); *F16C 2326/06* (2013.01)

(58) Field of Classification Search
USPC ......... 384/435–536, 561; 277/345, 349, 351, 277/412, 590; 464/133, 170
See application file for complete search history.

(56) References Cited

U.S. PATENT DOCUMENTS

| | | | | |
|---|---|---|---|---|
| 2,165,155 | A | 7/1939 | Schmal | |
| 3,309,154 | A * | 3/1967 | Stokely | F16C 27/066 384/536 |
| 4,551,116 | A | 11/1985 | Werner | |
| 4,708,499 | A * | 11/1987 | Loser | F16C 23/084 384/484 |
| 4,865,470 | A | 9/1989 | Mazziotti | |
| 6,296,394 | B1 * | 10/2001 | Braun | F16C 23/08 384/535 |
| 8,083,595 | B2 * | 12/2011 | Sanchez | F16D 1/108 464/17 |
| 8,475,052 | B2 * | 7/2013 | Ostrander | F16C 33/805 384/484 |
| 8,628,250 | B2 | 1/2014 | Oinuma et al. | |
| 2004/0218842 | A1 | 11/2004 | Min | |
| 2007/0093304 | A1 * | 4/2007 | Cermak | B60K 17/24 464/179 |
| 2008/0293502 | A1 * | 11/2008 | Oinuma | F16C 27/066 464/170 |

FOREIGN PATENT DOCUMENTS

| | | | |
|---|---|---|---|
| DE | 4008538 A1 | 9/1990 | |
| DE | 10358706 A1 | 11/2004 | |
| DE | 102006042064 B3 | 11/2007 | |
| DE | 102008007168 A1 * | 8/2009 | .............. F16C 19/06 |
| DE | 102015106696 B4 | 2/2017 | |
| GB | 1020137 A | 2/1966 | |
| GB | 2141207 A | 12/1984 | |
| JP | S5070354 U | 6/1975 | |
| JP | 54000839 | 1/1979 | |
| JP | H02246833 A | 10/1990 | |
| JP | 2009006990 A | 1/2009 | |
| JP | 2010091036 A | 4/2010 | |
| WO | 2014021179 A1 | 2/2014 | |

OTHER PUBLICATIONS

Machine-generated English Translation of DE4008538, obtained via Espacenet Patent Search.
Machine-generated English Translation of JPS5070354, obtained via Espacenet Patent Search.
Machine-generated English Translation of JPH02246833, obtained via Espacenet Patent Search.
Machine-generated English Translation of DE102015106696, obtained via Espacenet Patent Search.
International Preliminary Report on Patentability of International Appln. No. PCT/EP2016/051585, dated Mar. 23, 2017.
International Search Report of International Appln. No. PCT/EP2016/051585, dated Mar. 9, 2016.
English Translation of Apr. 28, 2018 Chinese Office Action.
Computer Translation of Apr. 17, 2018 Japanese Office Action.

* cited by examiner

INTERMEDIATE BEARING FOR A DRIVE SHAFT TRAIN

This application is a 35 USC 371 application claiming benefit of PCT/EP2016/051585 filed on Jan. 26, 2016, which claims the benefit of German application 10 2015 106 696.3 filed on Apr. 29, 2015, both of which are fully incorporated by reference herein.

BACKGROUND OF THE INVENTION

The present invention relates to an intermediate bearing for a drive shaft train of a motor vehicle, wherein the intermediate bearing comprises: an elastic bearing body, which has a bore, a supporting ring, which is arranged in the bore and has a receiving space for receiving a rolling bearing, wherein the receiving space defines a longitudinal axis, and two sealing disc, which are spaced apart axially from one another and have in each case one central opening for receiving a drive component, wherein the supporting ring is arranged between the two sealing discs.

The drive shaft train of a motor vehicle, in particular a utility motor vehicle, is used for transmitting a torque between a transmission and an axle differential in order to drive the wheels of the utility vehicle. The drive shaft train is usually designed in multiple parts and can be mounted on the underside of the motor vehicle via an intermediate bearing.

From U.S. Pat. No. 8,628,250 B2, an intermediate bearing for a drive shaft train of a motor vehicle is known. The intermediate bearing has an elastic bearing body, in which a staircase-like curved supporting ring is positioned. The supporting ring has a central region parallel to the longitudinal axis, in which a rolling bearing is inserted. In addition, the known intermediate bearing has two sealing disc arrangements axially spaced apart from each other, between which the supporting ring and the rolling bearing is positioned.

The object of the invention is to propose an intermediate bearing that is simple to produce, properly sealed and shielded against dirt, water and the like.

According to the invention, this object is achieved in an intermediate bearing for a drive shaft train of a motor vehicle of the above-mentioned type, by the fact that the sealing discs have in each case one groove extending concentrically to the longitudinal axis, wherein the supporting ring engages into the two grooves of the sealing discs.

SUMMARY OF THE INVENTION

In accordance with the invention, the supporting ring engages into the two grooves of the sealing discs in order to seal or shield a receiving space formed in the supporting ring. In this respect, the sealing discs could also be referred to as shielding discs. The sealing discs have in relation to the longitudinal axis, a larger radial extension than the supporting ring. In the installed state of the intermediate bearing, in which the intermediate bearing supports drive components of the drive shaft train, rotating drive components, in particular a drive shaft and/or a shaft flange engage though the central holes of the two sealing discs. The sealing discs are connected to the drive components in a rotationally fixed manner, so that the sealing discs also rotate about the longitudinal axis in the operation of the motor vehicle. By contrast, in the installed state of the intermediate bearing the supporting ring is held non-rotationally at the motor vehicle. Due to the engagement of the supporting ring into the grooves of the sealing discs, a labyrinth seal is provided between the rotating sealing discs and the stationary supporting ring preventing the ingress of water, dust or the like into the receiving space from the outside. Moreover, especially liquids acting on the intermediate bearing from the outside, for example by means of a water jet directed on to the drive shaft train for cleaning the motor vehicle, are deflected away from the intermediate bearing by the sealing discs. In this way, an effective sealing or shielding of the receiving space is ensured that is simple to produce, wherein in the receiving space a rolling bearing for supporting the drive components, in particular a drive shaft, can be inserted.

Preferably, the intermediate bearing has exactly two sealing discs. The use of exactly two sealing discs provides a very simple to produce intermediate bearing, which is well sealed and shielded against dirt, water and the like.

Furthermore, the grooves of the sealing discs can be arranged such that they are radially equally spaced from the longitudinal axis. In other words, both the grooves, which extend in a circumferential direction, have the same diameter. This means the supporting ring can have a geometry which is simple to produce. For example, the supporting ring can be designed cylindrically and engage into the grooves with both longitudinal end regions.

Furthermore, the grooves can be delimited by a U-shaped angled portion of the respective sealing disc. In other words, the grooves can have a rectangular cross-section, wherein the grooves are delimited only by three side walls of the respective sealing disc. The grooves are designed open on sides that face towards each other, so that the supporting ring being arranged between the two sealing discs can engage into the open sides of the grooves. On the sides that face towards each other, the grooves are preferably designed completely open, i.e. no other wall of the respective sealing disc narrows down the open side or extends radially between the open side of the respective groove and the supporting ring.

In accordance with one aspect of the present invention, it can be provided that the sealing discs are double-walled, at least in some sections, in the region of the grooves. Further, a radial inner wall of the respective sealing disc which forms the groove can be of double-walled design. This simplifies the production process of the sealing discs and increases their stability.

In accordance with a further aspect of the present invention, it can be provided that the sealing discs, in each case on a radial outer wall forming the groove, have a collar which extends at least substantially radially, wherein the collars of the sealing discs at least partially radially overlap the bearing body. This improves the protection of the intermediate bearing against penetration by dust, or a water jet directed onto the intermediate bearing for cleaning the vehicle, or the like. The term 'at least substantially radially' can mean on the one hand that the collars can extend radially with respect to the longitudinal axis, i.e. forming a right angle to the longitudinal axis. On the other hand, it can also be provided that the collars do not run at a 90° angle to the longitudinal axis, but can be arranged at an angle of more than 45° and less than 90° to the longitudinal axis.

The sealing discs can also be designed identically. In particular, the sealing discs can each be made in one piece. Furthermore, the sealing discs can be stamped and bended parts made from sheet metal. Thus, an intermediate bearing is provided that is simple to produce.

The supporting ring and/or the receiving space of the supporting ring is/are preferably designed cylindrically. The supporting ring can be a stamped and bended part made from sheet metal. For example, on order to form the receiving space, the supporting ring can be produced from a deep-drawn metal sheet, the centre of which is stamped out, so that a rolling bearing can be inserted and a drive shaft can engage through the supporting ring. The circumferential flange that is usually formed in the deep-drawing process can be cut off.

To improve the damping properties of the intermediate bearing, the bearing body can be designed as an elastomer ring.

In accordance with a further aspect, it is provided that the intermediate bearing further comprises a housing with a housing space, the bearing body being arranged in the housing space. In particular, the housing is of cup-shaped design, respectively U-shaped in longitudinal section. The intermediate bearing can thus be easily fastened to an underside of the motor vehicle by means of the housing. The bearing body, in particular the bearing body designed as an elastomer ring, can be fixed to the housing by means of vulcanization. Also, retaining elements can be provided to hold the bearing body in the housing space to the housing, in particular in the case of a laterally open U-shaped housing.

Furthermore, the intermediate bearing can have a rolling bearing, wherein the rolling bearing is inserted in the receiving space of the supporting ring. The rolling bearing is narrower in its axial extension than the supporting ring that engages into the grooves.

A preferred exemplary embodiment of the invention is shown in the drawings and described below. These show in:

DETAILED DESCRIPTION OF THE INVENTION

Figure 1:
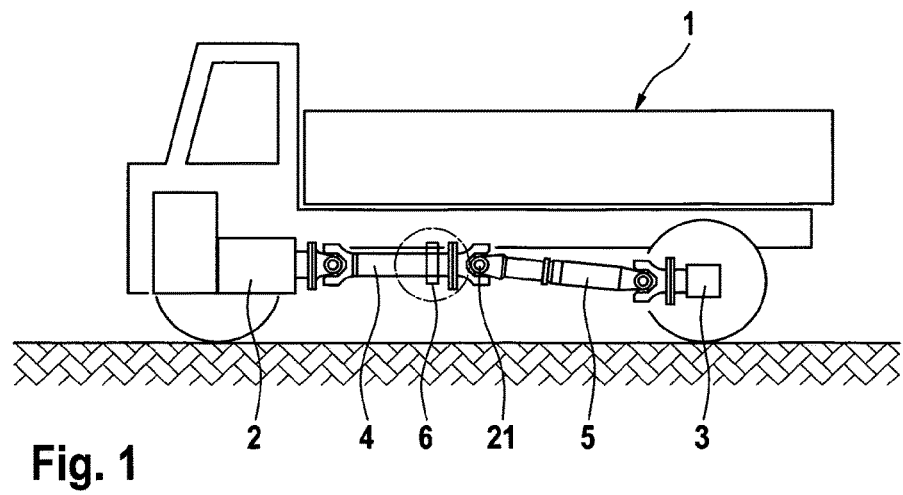
FIG. 1 schematically a motor vehicle with a drive shaft train for driving the rear wheels having an intermediate bearing in accordance with an embodiment of the present invention.

FIG. 1 shows a utility vehicle 1, in which the rear wheels are powered by the engine with the transmission 2. To transfer the torque from the transmission 2 onto a rear wheel differential 3, a drive shaft train is used. The drive shaft train comprises a first articulated shaft section 4 and a second articulated shaft section 5, which, here, is angled with respect to the first articulated shaft section 4. The two articulated shaft sections 4, 5 are connected to each other, wherein the first articulated shaft section 4, at its end remote from the transmission 2, is additionally mounted on the chassis of the utility vehicle 1 by way of an inventive intermediate bearing 6. Via the intermediate bearing 6, the first articulated shaft section 4 is rotationally mounted about a longitudinal axis, respectively an axis of rotation X.

Figure 2:
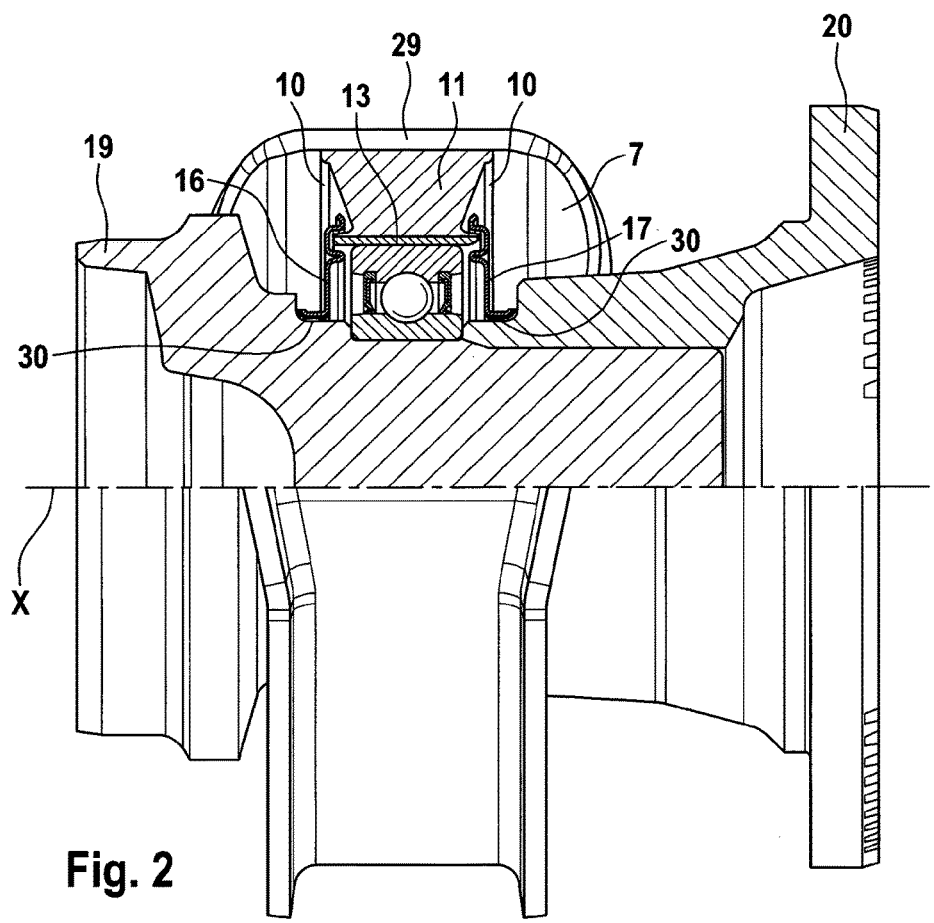
FIG. 2 an enlarged partial illustration of the drive shaft train of FIG. 1 with the intermediate bearing in a partially cut view.
Figure 3:
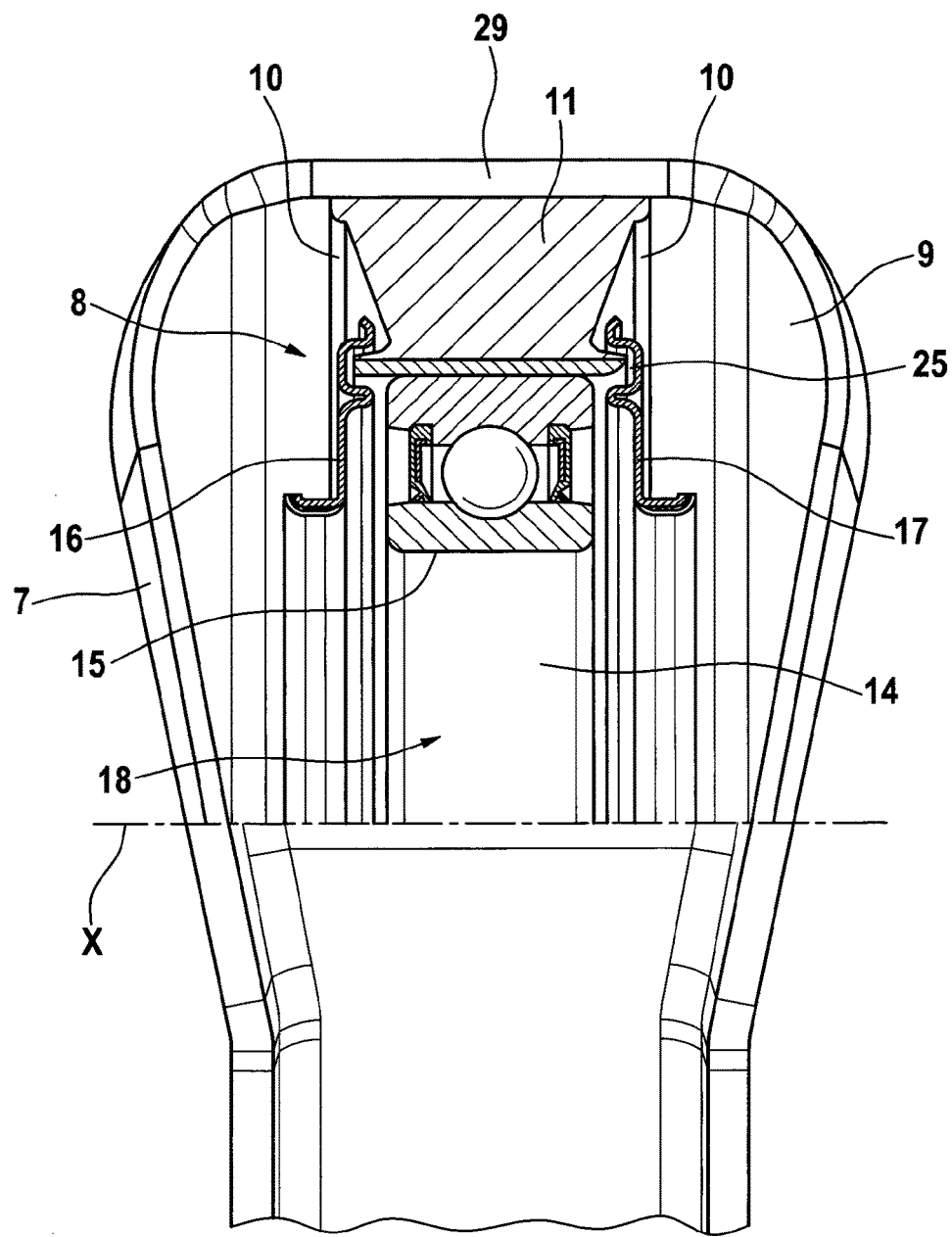
FIG. 3 the intermediate bearing in a partially cut view.
Figure 4:
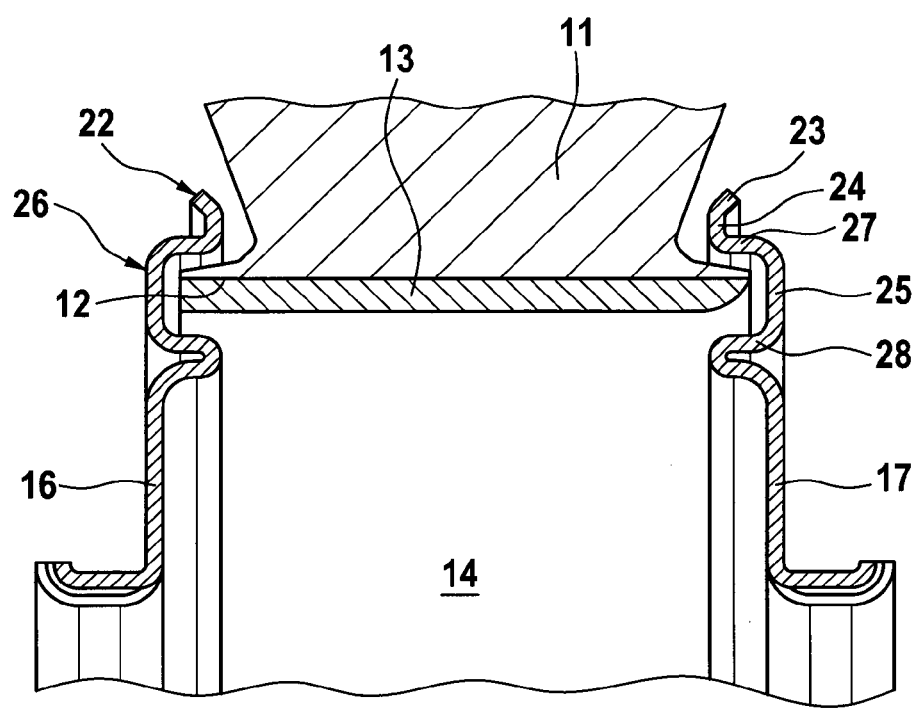
FIG. 4 an enlarged view of the intermediate bearing in a sectional view.

In FIGS. 2 to 4, the intermediate bearing 6 is shown in accordance with an embodiment of the present invention. The intermediate bearing 6 comprises a housing 7, which in longitudinal section has a U-shaped design, and defines a housing space 8. On an inward-facing wall 9 of the housing 7, perpendicular to the longitudinal axis X, a plurality of retaining tabs 10 distributed in the circumferential direction of the U-shaped housing 7 are formed, two axially spaced retaining tabs 10 in each case forming a pair. In the housing space 8, a bearing body 11 in the form of an elastomer ring is attached between the retaining tabs 10 by clamping. The elastomer ring 11 comprises a central bore 12. In the central bore 12 of the elastomer ring 11, a supporting ring 13 is inserted. The supporting ring 13, produced as a stamped and bended part made from sheet metal, has a cylindrical form. The supporting ring 13 surrounds a cylindrical receiving space 14, which defines the longitudinal axis X. The receiving space 14 accommodates a rolling bearing 15 for mounting the first articulated shaft section 4.

For sealing the receiving space 14 and for shielding the rolling bearing 15 accommodated in the receiving space 14, two sealing discs 16, 17 are provided axially spaced apart from the others. The two identically designed sealing discs 16, 17 are in each case made in one piece and stamped and bended parts made from sheet metal. The sealing discs 16, each have a central opening 18, which is arranged concentrically with respect to the longitudinal axis X. A drive shaft 19 of the first articulated shaft section 4 engages the central opening 18 of the sealing disc 16, shown on the left of FIG. 2 and oriented towards the transmission 2. The drive shaft 19 and a shaft flange 20 which is pushed onto the drive shaft 19 engages the central opening 18 of the sealing disc 17, shown on the right of FIG. 2 and oriented towards the rear-wheel differential 3. Via the shaft flange 20, the drive shaft 19 is connected to a universal joint 21, which connects the first articulated shaft section 4 to another universal joint of the second articulated shaft section 5. The two sealing discs 16, 17 are connected in a rotationally fixed manner to the drive shaft 19 and/or the shaft flange 20 by means of a press fitting. On the radially inner side, the sealing discs 16, 17 have four recesses 30 distributed in the circumferential direction, to ensure that, especially during the mounting of the intermediate bearing on the drive shaft 19 or shaft flange 20 or during possible coating processes in which the drive shaft 19 hangs vertically, liquids can be drained out of the receiving space 14 of the intermediate bearing 6.

The design of the sealing or shielding is explained in more detail by reference to FIG. 4, in which for the sake of clarity the rolling bearing 15 is not shown. On the radially outer longitudinal end regions of the sealing discs 16, 17, collars 22 are formed, which overlap a radially inner region of the elastomer ring 9. At the longitudinal ends, the collars 22 are bent towards the outside, i.e. directed away from each other, so that an imaginary line through a bent longitudinal end 23 encloses an angle of approximately 70° with the longitudinal axis X. The bent longitudinal end 23 is joined to a portion 24 of the collar 22 which extends radially with respect to the longitudinal axis X. Radially further inward, the respective sealing disc 16, 17 has a groove 25 that extends concentrically with respect to the longitudinal axis X and that is radially equally spaced apart from the longitudinal axis X. The grooves 25 are delimited by an angled portion of the respective sealing disc 16, 17, wherein the collar 22 is joined to a radially outer wall 27 of the respective groove 25. The angled section 26 has a U-shaped design, so that the grooves 25 have a rectangular cross-section. A radially inner wall 28 of the angled portion 26 of the respective sealing disc 16, 17 is double-walled.

The supporting ring 13 is arranged between the two axially spaced sealing discs 16, 17. To seal the receiving space 14, the supporting ring 13 engages into the grooves 25 of the two sealing discs 16, 17. This provides a labyrinth seal which seals the receiving space 14 and the rolling bearing 15 being inserted into the receiving space 14, so that no water, dirt or the like can penetrate into the receiving space 14 from the outside. By means of the collars 22 it is also ensured that, for example, during the cleaning of the utility vehicle 1 using a water jet directed onto the intermediate bearing 6, water bounces off and, respectively, is deflected by the labyrinth seal formed in the region of the grooves 25 by the sealing discs 16, 17 and the supporting ring 13.

In use, the two sealing discs 16, 17 rotate about the longitudinal axis X together with the first articulated shaft section 4. By contrast, the supporting ring 13 being inserted in the elastomer ring 11 stands still, because the housing 7 is held on a vehicle chassis of the utility vehicle 1 in a non-rotationally manner via a retaining plate 29 spanning over both the U-shaped housing space 8 and the elastomer ring 11 being arranged in the housing space 7.

REFERENCE LIST 1 utility vehicle
2 transmission
3 rear-wheel differential
4 first articulated shaft section
5 second articulated shaft section
6 intermediate bearing
7 housing
8 housing space
9 wall
10 retaining tab
11 elastomer ring
12 bore
13 supporting ring
14 receiving space
15 rolling bearing
16 sealing disc
17 sealing disc
18 opening
19 drive shaft
20 shaft flange
21 universal joint
22 collar
23 bent longitudinal end
24 radial portion
25 groove
26 angled portion
27 outer wall
28 inner wall
29 retaining plate
30 recesses
X longitudinal axis

The invention claimed is:

1. An intermediate bearing for a drive shaft train of a motor vehicle, said intermediate bearing comprising:
   an elastic bearing body, which has a bore,
   a supporting ring, which is arranged in the bore and has a receiving space for receiving a rolling bearing, wherein the receiving space defines a longitudinal axis, and
   two sealing discs, which are axially spaced apart from one another and each have a central opening for receiving a drive component, wherein the supporting ring is arranged between the two sealing discs,
wherein
   the two sealing discs each have one groove, which extends concentrically with respect to the longitudinal axis, wherein the supporting ring engages into the two grooves of the two sealing discs that are double-walled, at least in some sections, in the region of the two grooves, wherein by means of the two sealing discs a labyrinth seal for sealing the receiving space is formed in the region of the two grooves and the supporting ring engaging into the two grooves.

2. The intermediate bearing according to claim 1, wherein the two grooves of the two sealing discs are equally spaced apart radially with respect to the longitudinal axis.

3. The intermediate bearing according to claim 2, wherein the two grooves are delimited by a U-shaped angled section of the respective sealing disc.

4. The intermediate bearing according to claim 1, wherein a radial inner wall of the respective sealing disc which forms the respective groove is double-walled.

5. The intermediate bearing according to claim 1, wherein the two sealing discs each have a collar on a radial outer wall forming the groove, wherein the respective collar extends at least substantially radially, wherein the collars of the two sealing discs at least partially radially overlap the bearing body.

6. The intermediate bearing according to claim 1, wherein the two sealing discs are designed identically.

7. The intermediate bearing according to claim 1, wherein the two sealing discs are each made in one piece.

8. The intermediate bearing according to claim 1, wherein the two sealing discs are stamped and bended parts made from sheet metal.

9. The intermediate bearing according to claim 1, wherein the supporting ring is designed cylindrically.

10. The intermediate bearing according to claim 1, wherein the supporting ring is a stamped and bended part made from sheet metal.

11. The intermediate bearing according to claim 1, wherein the bearing body is designed as an elastomer ring.

12. The intermediate bearing according to claim 1, wherein the intermediate bearing further comprises a housing with a housing space, wherein the bearing body is arranged in the housing space.

13. The intermediate bearing according to claim 12, wherein the housing is a cup-shaped design.

* * * * *